United States Patent [19]

Wall, Jr.

[11] Patent Number: 5,046,173
[45] Date of Patent: Sep. 3, 1991

[54] SINGLE BRANCH CIRCUIT BREAKER SUPPORT
[75] Inventor: Robert A. Wall, Jr., Salisbury, N.C.
[73] Assignee: General Electric Company, New York, N.Y.
[21] Appl. No.: 599,608
[22] Filed: Oct. 18, 1990
[51] Int. Cl.[5] ............................................. H02B 1/04
[52] U.S. Cl. ................................. 361/353; 361/355; 361/363; 361/376
[58] Field of Search ........ 361/333, 334, 346, 353–356, 361/358, 360–361, 363, 376

[56] References Cited

U.S. PATENT DOCUMENTS

| | | | |
|---|---|---|---|
| 4,667,268 | 5/1987 | Mrowka | 361/353 |
| 4,667,269 | 5/1987 | Morby et al. | 361/355 |
| 4,679,016 | 7/1987 | Ciarcia et al. | 335/132 |
| 4,783,718 | 11/1988 | Raabe et al. | 361/363 |
| 4,916,574 | 4/1990 | Hancock et al. | 361/355 |

Primary Examiner—Gregory D. Thompson
Attorney, Agent, or Firm—Richard A. Menelly; Walter C. Bernkopf; Fred Jacob

[57] ABSTRACT

A compact single branch circuit breaker insulative support used within lighting panelboards is converted from an existing double branch support with minor alterations. The single branch circuit breaker arrangement allows the circuit breakers to be arranged in a closely-packed configuration within the lighting panelboard enclosure.

10 Claims, 4 Drawing Sheets

SINGLE BRANCH CIRCUIT BREAKER SUPPORT

BACKGROUND OF THE INVENTION

Electrical lighting panelboard enclosures generally include a plurality of molded case circuit breakers connected with the electric panelboard branch straps in a so-called "double branch" arrangement whereby a pair of opposingly-facing circuit breakers are connected to the same branch strap. The use of double branch circuit breaker arrangements within lighting panelboards is described, for example in U.S. Pat. Nos. 4,667,268 and 4,783,718. The circuit breakers are supported upon a plastic saddle configuration that includes integrally-formed circuit breaker hooks for ease in attachment of the circuit breaker to the branch strap along with integrally-formed insulating baffles to insure electrical isolation between the separate phases of a multi-phase electrical distribution circuit. The arrangement of parallel columns of double branch circuit breakers requires a panelboard enclosure of sufficient width to accommodate the resulting double width of the circuit breakers.

When a so-called "split neutral" arrangement such as described in U.S. Pat. No. 4,667,269, wherein a pair of neutral bus bar conductors are arranged outboard the double column of circuit breakers on the circuit breaker support saddle, additional space must be provided within the lighting panelboard enclosure to accommodate the increased width of the corresponding neutral bus bar conductors.

In certain OEM applications, where the electrical equipment manufacturer provides supplemental electrical equipment alongside the panelboard enclosure, the circuit breakers are arranged in a compact single column array with each circuit breaker electrically connected to a separate branch strap on the circuit breaker insulative support within the lighting panelboard enclosure and with a single neutral bus bar positioned at the line end of the circuit breaker insulative support rather than on the sides. Accordingly, it would be economically advantageous to use common components within both double branch and single branch circuit breaker insulative supports.

The instant invention proposes a single branch circuit breaker insulative support for compact lighting panelboard enclosures that employs slightly modified components from double branch circuit breaker insulative supports with the modified components arranged in a correspondingly compact configuration.

SUMMARY OF THE INVENTION

The invention comprises a lighting panelboard single branch circuit breaker insulative support arranged for supporting the circuit breakers within the lighting panelboard enclosure in a compact single column array. The additional space provided alongside the lighting panelboard enclosure accommodates supplemental electrical equipment.

DESCRIPTION OF THE PREFERRED EMBODIMENT

Figure 1:
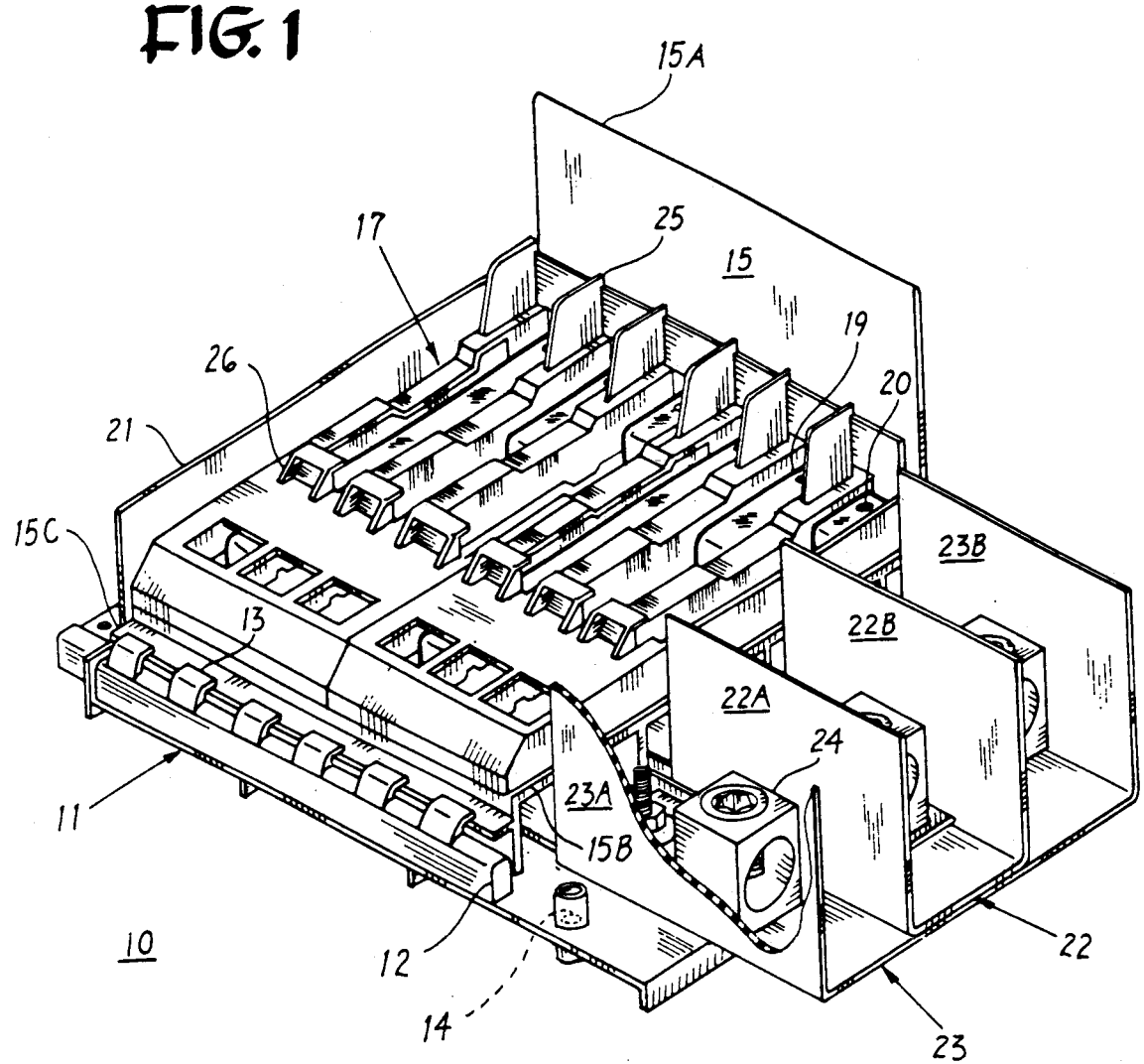
FIG. 1 is a top perspective view of the single branch circuit breaker insulative support in accordance with the invention.

The single branch circuit breaker insulative support 10 is shown in FIG. 1 and includes a bottom 11 made of a molded plastic configuration that integrally includes a pair of rails 12 extending along opposite sides similar to that described within the aforementioned U.S. Pat. No. 4,667,269 entitled "Circuit Breaker Support Saddle Having a Split Neutral Connector". As further described within the aforementioned U.S. Pat. No. 4,667,269 a plurality of circuit breaker hooks 13 are integrally-formed with and extend from the top of the rails for facilitating the attachment of the circuit breakers and a plurality of thru-holes 14 are formed at the ends thereof for ease in attaching the insulative support to the lighting panelboard enclosure. The insulative support differs from that described within U.S. Pat. No. 4,667,269 by the addition of an angulated insulation barrier 15 that is shaped to provide a top part 15A that insulates the circuit breakers from the side walls of the lighting panelboard enclosure, and an apertured bottom part 15B extending perpendicular from the top part and which terminates at an edge 15C that is received under and retained by the circuit breaker hooks 13 in a manner to be described below in greater detail. A series of elongated slots 16 (FIG. 2) of varying positions are formed within the bottom part 15B to provide access to the Z-shaped branch straps 19. The circuit breakers (not shown) are electrically connected with the branch straps by means of the threaded openings 20 provided at one end. The end barrier 21 standing upright along one edge of the bottom 11 electrically isolates the insulative support from the lighting panelboard enclosure. A pair of line lug barriers 22, 23 provide electrical isolation between the separate phases of a multi-phase power distribution circuit when connected to the line lugs 24. The central line lug barrier 22 includes two upstanding baffles 22A, 22B to electrically isolate between the separate phases while the outer line lug barrier 23 terminates in two upstanding barriers 23A, 23B to electrically isolate the line lugs from the adjoining interior of the lighting panelboard enclosure. The plastic base 17 directly supports the circuit breakers which attach to the base by means of the hooks 26 on one end of the base and are electrically isolated from each other by means of the phase barriers 25 integrally-formed within the opposite end of the base.

Figure 2:
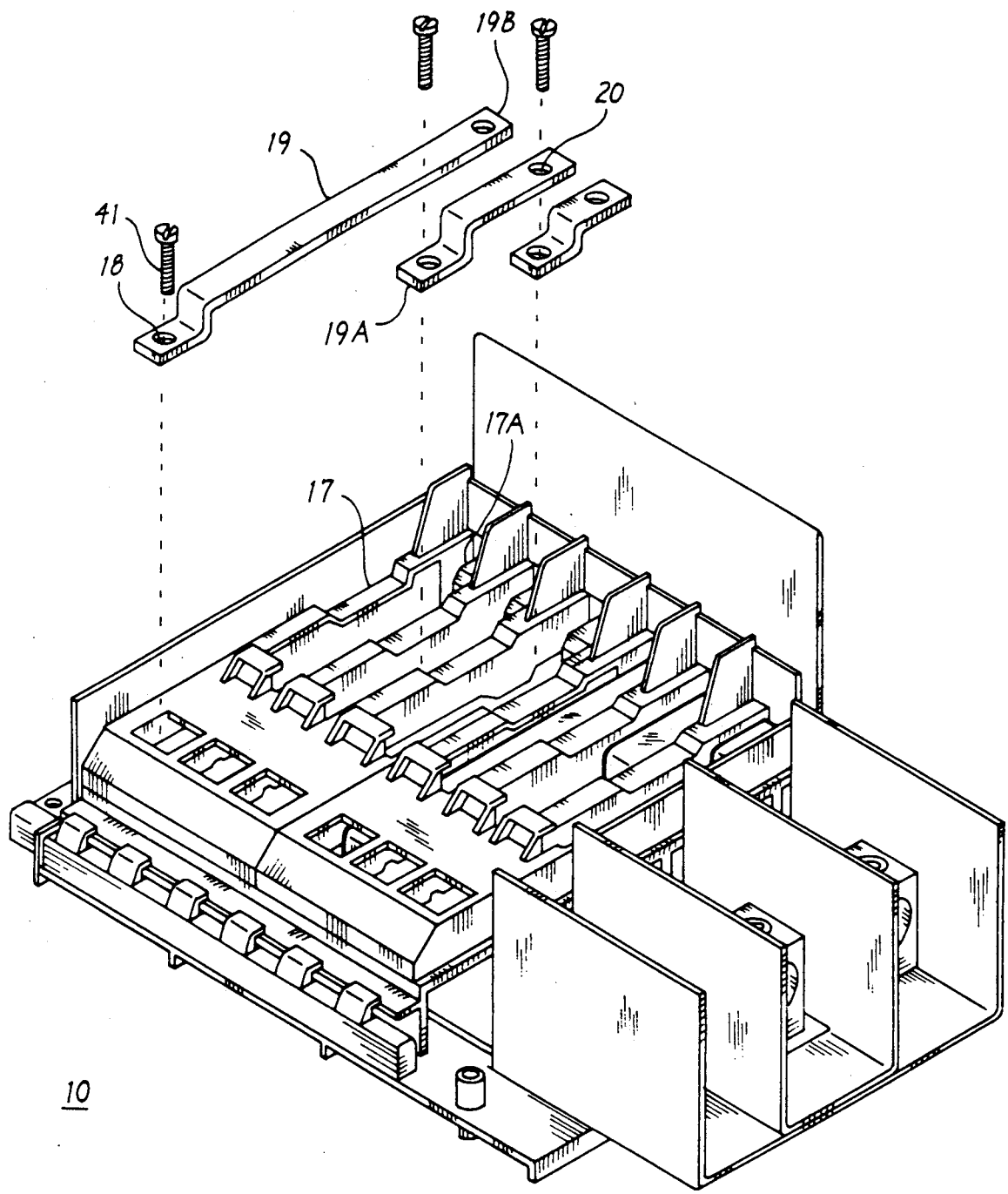
FIG. 2 is a top perspective view of the single branch circuit breaker support of FIG. 1 prior to assembly of the insulating baffles.

The subassembly of the insulative support 10 is best seen by referring now to FIG. 2 where the plastic bottom 11 is shown with the bus bars 27 and threaded openings 28 positioned thereon. The angulated insulation barrier 15 is next positioned on the top surface of the bottom and is arranged such that the edge 15C underlays the circuit breaker hooks 13A on one side of the bottom of the insulative support and sits on top of the opposing set of circuit breaker hooks 13B on the opposite side thereof. The elongated slots 16 formed through the bottom 15B of the angulated insulation barrier 15 are each aligned with the threaded openings 28 through each of the bus bars 27. The line lugs 24 are attached to the ends of the bus bars by means of a flatheaded screw 30 captured beneath the bus bars and extending upward through the threaded openings 28. The screw is received within a thru-hole 33 arranged through the bottom extension 32 of the line lugs 24 and is attached to the line lugs by means of a nut 31. The tabs 34 extending from the outer lug barrier 23 are adhesively attached to the bottom of the insulative support under the ends of the corresponding bus bars 27 and the central lug barrier 22 is adhesively attached to the outer lug barrier to complete the subassembly process.

Figure 3:
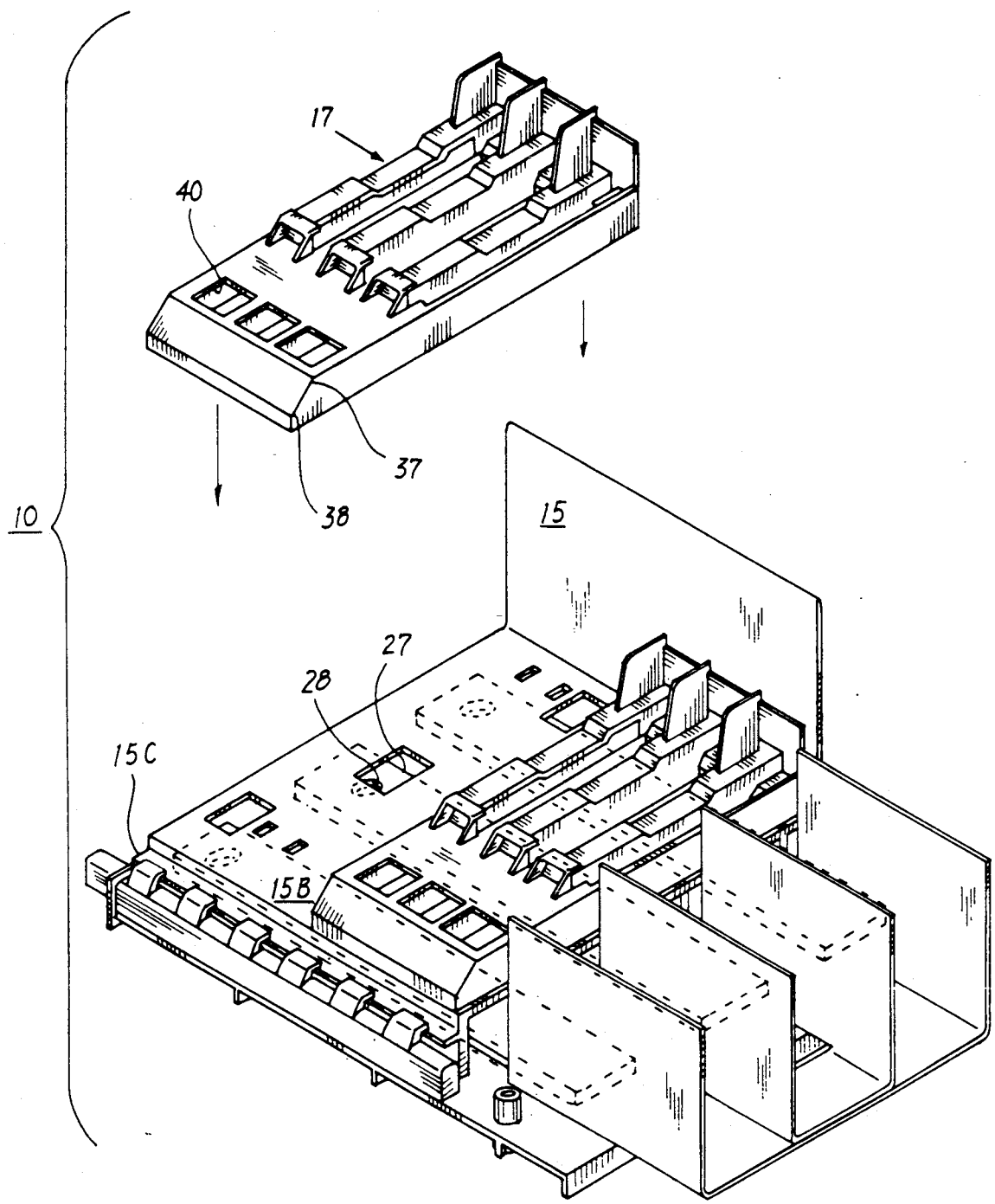
FIG. 3 is a top perspective view of the circuit breaker support of FIG. 1 with one of the insulative base assemblies in isometric projection.

The partially-assembled insulative support 10 is depicted in FIG. 3 with the angulated insulation barrier 15 attached and with the bus bars 27 arranged such that the threaded openings 28 in the bus bars are aligned under the access slots as indicated at 40 through the plastic base 17 when the plastic base is next attached to the insulative support. The plastic base 17 is aligned over the bottom 15B of the angulated insulation barrier 15 by positioning the bottom 38 of the angled front part 37 of the plastic base over the edge 15C of the bottom 15B of the insulative support 15.

Figure 4:
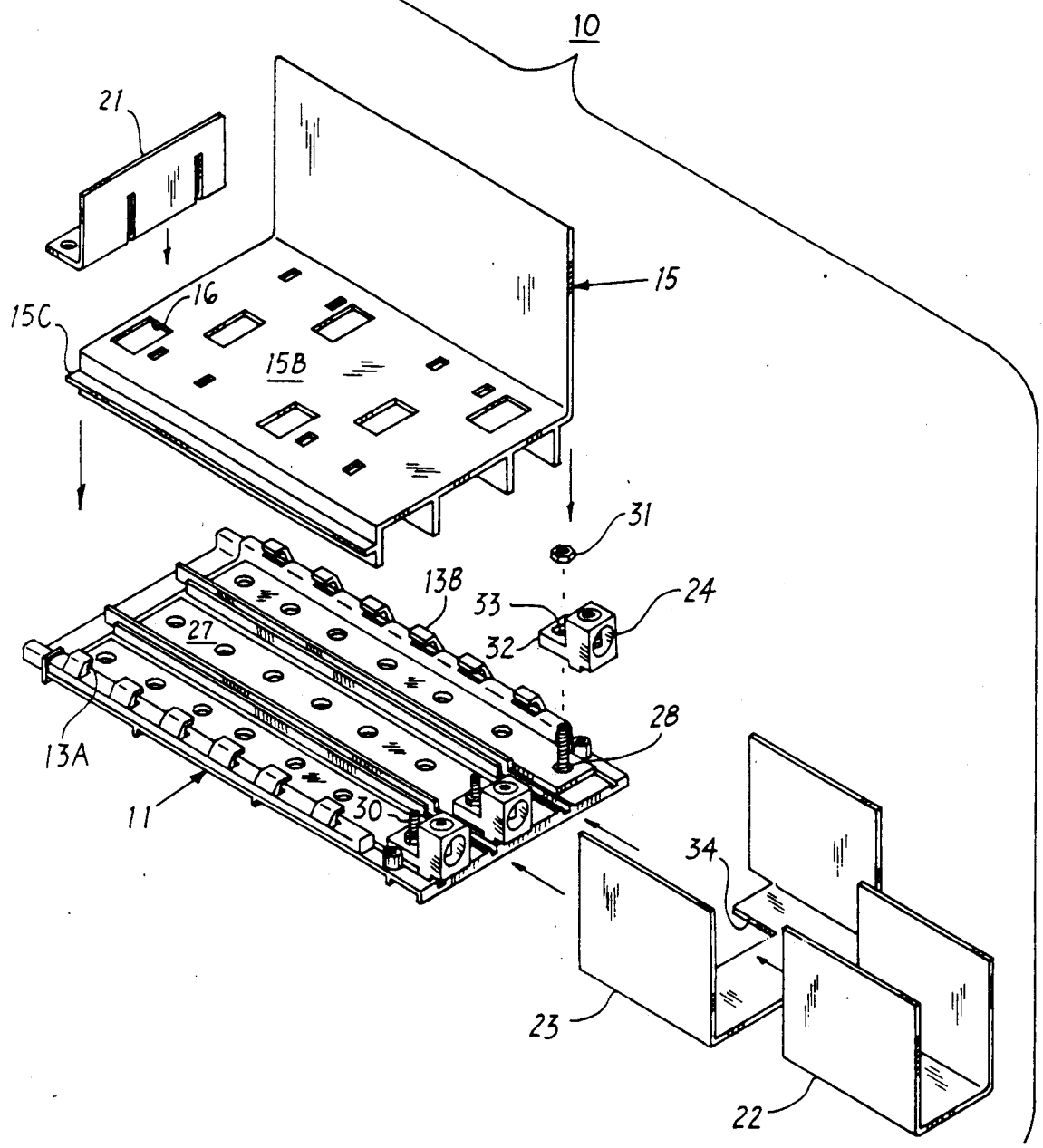
FIG. 4 is a top perspective view of the circuit breaker support of FIG. 1 with three of the circuit breaker branch straps depicted in isometric projection.

The plastic base 17 is secured to the insulative support 10 in the manner seen by referring now to FIG. 4 wherein the Z-shaped branch straps 19 are fastened to the bus bars 27 shown in FIG. 3, by inserting the screws 41 within the thru-holes 18 formed at the short end 19A of the Z-shaped branch strap 19. The long end 19B of the Z-shaped branch strap 19 sits upon the shelf 17A formed integrally within the plastic base 17. Attaching the short side 19A of the Z-shaped branch strap to the bus bars multi-functionally holds the plastic base 17 securely against the insulative support 10 while electrically and mechanically securing the branch straps to the bus bars. The threaded openings 20 in the Z-shaped branch straps are used to secure the circuit breakers to the Z-shaped branch straps for electrical and mechanical connection with the insulative support. A good example of one such "bolt-on" circuit breaker is described in U.S. Pat. No. 4,679,016 which Patent and all previously mentioned Patents are incorporated herein for purposes of reference.

Having thus described my invention, what I claim as new and desire to secure by Letters Patent is:

1. A molded case circuit breaker insulative support comprising in combination:
   a planar plastic bottom having a pair of upstanding rails extending along opposing sides thereon;
   an angulated plastic insulative barrier having an upstanding back part and a planar bottom part extending perpendicular to said upstanding back part attached to said plastic bottom, said planar bottom part including a plurality of rectangular apertures providing access to a plurality of Z-shaped load straps;
   a plurality of electrical bus conductors attached to said plastic bottom; and
   a plastic base attached to said plastic bottom and having a plurality of apertures, said plastic base extending across said upstanding rails and adapted to provide support to a plurality of circuit breakers;
   said Z-shaped load straps being attached to said bus conductors and adapted to provide electrical and mechanical connection to circuit breakers, said Z-shaped load straps being accessible through said apertures in said plastic base.

2. The insulative support of claim 1 including a first plurality of hooks extending from a top part of said rails, on opposite ends of said plastic bottom.

3. The insulative support of claim 2 wherein one end of said bottom part rests upon said first hooks on one of said ends and an opposing end of said bottom part extends partially under said first hooks on an opposite one of said ends.

4. The insulative support of claim 1 including a second plurality of hooks on one side of said base and adapted to provide support to circuit breakers on one side.

5. The insulative support of claim 4 including a shelf extending along said base on a side opposite said one side.

6. The insulative support of claim 5 wherein each of said Z-shaped load straps includes a long end and a shorter end, said shorter end being attached to said bus conductors and said long end overlapping a part of said shelf to thereby secure said base to said plastic bottom.

7. The insulative support of claim 1 including a corresponding plurality of line lugs attached to one end of said bus conductors adapted to provide electrical connection with an electrical power distribution circuit.

8. The insulative support of claim 7 including an outer pair of line lug insulative barriers outboard an outer pair of said line lugs and adapted to electrically isolating said outer pair from an electrical enclosure.

9. The insulative support of claim 8 including an inner pair of inner lug insulative barriers inboard said outer pair of line lugs providing electric isolation to an inner line lug intermediate said outer pair of line lugs.

10. The insulative support of claim 9 including an end barrier on a further side of said plastic bottom opposite said inner lug insulative barrier and said outer lug insulative barrier and adapted to provide electrical isolation between said further side and an electrical enclosure.

* * * * *